(12) United States Patent
Kolouch (10) Patent No.: US 6,694,433 B1
(45) Date of Patent: Feb. 17, 2004

(54) XML ENCRYPTION SCHEME

(75) Inventor: James L. Kolouch, Vienna, VA (US)

(73) Assignee: TecSec, Inc., Vienna, VA (US)

( * ) Notice: Subject to any disclaimer, the term of this patent is extended or adjusted under 35 U.S.C. 154(b) by 0 days.

(21) Appl. No.: 09/421,293

(22) Filed: Oct. 20, 1999

Related U.S. Application Data (63) Continuation-in-part of application No. 09/074,649, filed on May 8, 1998, now abandoned
(60) Provisional application No. 60/045,935, filed on May 8, 1997.

(51) Int. Cl.$^7$ ................................................. H04L 9/00
(52) U.S. Cl. ......................... 713/176; 707/102; 705/36
(58) Field of Search ........................... 381/51, 55, 233, 381/246; 705/60, 63, 75, 8, 24, 30, 401, 404; 713/189, 193

(56) References Cited

U.S. PATENT DOCUMENTS 3,956,615 A * 5/1976 Anderson et al. ............. 705/72
4,218,582 A     8/1980 Hellman et al.
4,405,829 A     9/1983 Rivest et al.

(List continued on next page.)

FOREIGN PATENT DOCUMENTS

GB          2293737 A  *  4/1996  ............. H04L/9/30

OTHER PUBLICATIONS

Rumbaugh, James, et al. "Object–Oriented Modeling and Design." Prentice Hall. 1991. Sections 10.6 and 14.3.*
Massey; An Introduction to Contemporary Cryptology; Proceedings of the IEEE; 1988; pp. 533–549; vol. 76; No. 5.

Schneier; Untangling Public–Key Cryptography; Dr. Dobb's Journal; May 1992; pp. 16–28.

Bray et al. (Eds.), "Extensible Markup Language (XML) 1.0", W3C Recommendations, Feb. 10, 1998, World Wide Web Consortium, www.w3.org/TR/1998/REC–xml–19980210.

Cover, "XML and Encryption", "The SGML/XML Web Page", Nov. 8, 2000 or earlier, Organization for the Advancement of Structured Information Standards, www.oasis–open.org/cover/xmlAndEncryption.html.

Reagle et al. (Eds.), "Draft Minutes", "Minutes W3C XML–Encryption Workshop", Nov. 2, 2000 or earlier, World Wide Web Consortium, www.w3.org/2000/11/02–xml–encryption–ws/minutes.html.

(List continued on next page.)

*Primary Examiner*—Gail Hayes
*Assistant Examiner*—Chi Chung Lee
(74) *Attorney, Agent, or Firm*—IP Strategies, PC (57) ABSTRACT

A secure accounting and operational method, whereby process elements are provided to a process, selected process elements are manipulated, a scheduled condition of the process is sampled at a predetermined point in the process, and the process sample is encrypted to provide an encrypted output. As a result, an authorized recipient has a high level of confidence in the reliability of the scheduled condition samples due to the integrity provided by the encryption process.

12 Claims, 8 Drawing Sheets

U.S. PATENT DOCUMENTS

| | | | |
|---|---|---|---|
| 4,424,414 A | | 1/1984 | Hellman et al. |
| 4,713,753 A | | 12/1987 | Boebert et al. |
| 4,757,537 A | * | 7/1988 | Edelman et al. ............... 380/51 |
| 4,864,616 A | * | 9/1989 | Pond et al. .................... 380/45 |
| 4,955,082 A | | 9/1990 | Hattori et al. |
| 4,962,533 A | | 10/1990 | Krueger et al. |
| 4,984,272 A | | 1/1991 | McIlroy et al. |
| 5,052,040 A | | 9/1991 | Preston et al. |
| 5,065,429 A | | 11/1991 | Lang |
| 5,191,611 A | | 3/1993 | Lang |
| 5,204,961 A | | 4/1993 | Barlow |
| 5,222,018 A | * | 6/1993 | Sharpe et al. ................. 705/30 |
| 5,319,562 A | * | 6/1994 | Whitehouse ................ 705/403 |
| 5,369,702 A | | 11/1994 | Shanton |
| 5,369,707 A | | 11/1994 | Follendore, III |
| 5,499,297 A | | 3/1996 | Boebert |
| 5,535,279 A | * | 7/1996 | Seestrom ..................... 380/55 |
| 5,535,297 A | | 7/1996 | Goettsche |
| 5,602,921 A | * | 2/1997 | Ramadei et al. .............. 380/51 |
| 5,680,452 A | | 10/1997 | Shanton |
| 5,684,705 A | | 11/1997 | Herbert |
| 5,694,472 A | | 12/1997 | Johnson et al. |
| 5,696,829 A | * | 12/1997 | Cordery et al. ............... 380/55 |
| 5,717,755 A | | 2/1998 | Shanton |
| 5,749,078 A | * | 5/1998 | Gargiulo et al. ............ 705/404 |
| 5,778,066 A | * | 7/1998 | Shah et al. .................... 705/62 |
| 5,794,234 A | * | 8/1998 | Church et al. ................. 707/4 |
| 5,898,781 A | | 4/1999 | Shanton |
| 5,999,623 A | * | 12/1999 | Bowman et al. ............ 380/239 |
| 6,055,634 A | * | 4/2000 | Severwright ................ 713/153 |
| 6,098,071 A | * | 8/2000 | Aoyama et al. ............ 707/102 |
| 6,105,012 A | * | 8/2000 | Chang et al. ............... 380/277 |
| 6,169,805 B1 | * | 1/2001 | Dunn et al. ................. 380/259 |
| 6,223,287 B1 | * | 4/2001 | Douglas et al. ............. 380/255 |
| 6,370,516 B1 | * | 4/2002 | Reese .......................... 705/36 |
| 6,385,552 B1 | * | 5/2002 | Snyder ....................... 702/123 |

OTHER PUBLICATIONS

Reagle, "XML Encryption Requirements", Apr. 20, 2001, World Wide Web Consortium, www.w3.org/TR/xml-encryption-req.html.

Reagle, "XML Encryption WG", Sep. 13, 2001 or earlier, World Wide Web Consortium, www.w3.org/Encryption/2001.

Dillaway et al., "XML Encryption Syntax and Processing Version 1.0", Dec. 15, 2000, World Wide Web Consortium, lists.w3.org/Archives/Public/xml-encryption/2000Dec/att-0024/01-XMLEncryption_v01.html.

Imamura et al. (Eds.), "Decryption Transform for XML Signature", Jun. 26, 2001, World Wide Web Consortium, www.w3.org/TR/xmlenc-decrypt-20010626.

Refnes, "Introduction to XML", "XML 101", Aug. 28, 2001 or earlier, Internet.com, www.xml101.com/xml/xml_intro.asp.

Refnes, "How can XML be used?", "XML 101", Aug. 28, 2001 or earlier, Internet.com, www.xml101.com/xml/xml_usedfor.asp.

Refnes, "XML Syntax", "XML 101", Aug. 28, 2001 or earlier, Internet.com, www.xml101.com/xml/xml_syntax.asp.

Refnes, "XML Atributes", "XML 101", Aug. 28, 2001 or earlier, Internet.com, www.xml101.com/xml/xml_attributes.asp.

Garshol, "Re: XML, Links and DTDs", Usenet: comp.text.sgml, Aug. 11, 1998.

Murphy, "Re: opionions [sik] needed: will XML help me for this?", Usenet: microsoft.public.xml, Oct. 5, 1998.

Imamura et al., "Specification of Element-wise XML Encryption", Aug. 2000, lists.w3.org/Archives/Public/xml-encryption/2000Aug/att-0005/01-xmlenc-spec.html.

* cited by examiner

XML ENCRYPTION SCHEME

CROSS-REFERENCE TO RELATED DOCUMENTS

This is a continuation-in-part of U.S. patent application Ser. No. 09/074,649, filed on May 8, 1998, now abandoned, which in turn claimed priority under 35 U.S.C. §119 of U.S. Provisional Patent Application Seroal No, 60/045,935, filed on May 8, 1997. This disclosure is also related to U.S. Pat. No. 5,369,702, entitled "Distributed Cryptographic Object Method," which issued on Nov. 29, 1994 to Shanton; to U.S. Pat. No. 5,680,452, entitled "Distributed Cryptographic Object Method," which issued on Oct. 21, 1997 to Shanton; to U.S. Pat. No. 5,717,755, entitled "Distributed Cryptographic Object Method," which issued on Feb. 10, 1998 to Shanton; and to U.S. Pat. No. 5,898,781, entitled "Distributed Cryptographic Object Method," which issued on Apr. 27, 1999 to Shanton. This disclosure is also related to the following co-pending U.S. patent applications: Ser. No. 09/205,221, entitled "Access Control and Authorization System," filed on Dec. 4, 1998 by Scheidt et al.; Ser. No. 09/388,195, entitled "Encryption Process Including a Biometric Input," filed on Sep. 1, 1999 by Scheidt; Ser. No. 10/060,011, entitled "Multiple Level Access System," filed on Jan. 30, 2002 by Scheidt et al.; and Ser. No. 09/992,529, entitled "Cryptographic Key Split Binder For Use With Tagged Data Elements," filed on Nov. 20, 2001 by Wack et al.

FIELD OF THE INVENTION

Generally, cryptographic systems are used to prevent unauthorized disclosure of information during transmission and/or storage of data. The process of encryption involves the manipulation of data so that it is unreadable, in effect making the content inaccessible, to an unauthorized entity. The process of decryption involves the manipulation of encrypted data so as to recreate the original scheduled condition of the data, or to transform the encrypted data into readable data that corresponds to the original unencrypted data. Secrecy is not the only advantage provided by encryption. The process of encryption ensures data integrity, as encrypted data that has been modified does not decrypt properly unless the proper, that is, authorized, procedures are followed. It is the integrity property provided by encryption that is used by the present invention, as well as its security properties.

BACKGROUND OF THE INVENTION

The corporate world used to depend solely on paper to operate. Hard copy documents were used to provide corporate governance, settle disputes at law, and formed the basis for audits by tax and regulatory authorities, internal authorized recipients, and independent accountants. In many instances, this is no longer the case. As business moves to electronic operational and accounting systems, hard copy documents in many cases either do not exist or are merely incidental to electronic records. This lack of hard copy affects the ability of management and other interested parties to manage and audit corporate systems.

An original paper document carries a degree of presumption of authenticity that cannot currently be attributed to an electronic file. Changes can be virtually impossible to detect in the electronic world. With electronic data interchange, a company uses computers, computer programs, and transmission links to automatically transact business with customers and suppliers. With image processing systems, documents are scanned and converted to digital images. The original documents may not be retained. Some electronic information may exist for only a short time and may not be retrievable if files are updated and backup files do not exist.

A company may have many information and control systems. In this context, a system is the entire combination, or a logical sub-part, of tangible and intangible elements that, acting together, protect assets and provide reliable data, or the assurance thereof. The tangible part of the system includes, but is not limited to, paper documents and the markings and signatures made thereon, as well as the physical processes and procedures used to safeguard assets. System intangibles include policies and procedures providing instructions and structure to the business process.

Management and other interested parties must determine that policies, procedures, and instructions are carried out to a sufficient degree in a timely fashion. Information and control systems provide this assurance. Authorized recipients review information and control systems to determine if the design of each meets stated objectives. They also review the synergistic effect of all relevant systems to determine their overall effectiveness. If the sum of all system designs are deemed to be effective in producing stated objectives, authorized recipients then must perform tests of these systems in order to prove the systems actually exist and are functioning as represented by management.

Based on the volume of information involved, authorized recipients and others reviewing corporate activities cannot directly examine all activities and data produced by a company. They must devise tests for evaluating the activities and data that they can directly examine, in order to provide a reliable indication of the overall well-being of the corporation. The nature, timing, and extent of these tests are based on professional judgment. Tests include those steps necessary to verify that stated control elements exist and are functioning as intended. Tests also include the examination of particular transactions to provide operational assurance on a statistical basis.

The tests of both controls and transactions may include the examination of documents produced both within the company and by outside entities. For some audit objectives, such as confirmation of balances, activities, agreements, etc., evidence will be obtained from parties independent of the company. The authorized recipient's goal is to reduce to an acceptable level the risk of not discovering a material misstatement or system control deficiency. If an authorized recipient cannot reduce detection risk to an acceptable level, it may be impossible to render an unqualified opinion.

As more businesses adopt electronic systems and interact electronically with vendors and customers, the ability to reliably audit both controls and transactions is greatly diminished, perhaps, in some cases, to the point that serious adverse control and audit consequences will become common.

SUMMARY OF THE INVENTION

An objective of the present invention is to use encryption and encrypted objects to record and authenticate inputs, processes, scheduled conditions, and virtual environments of electronic accounting and operational systems, and to provide a means to distribute these encrypted objects to designated locations for access by designated individuals or entities.

Inputs in this context can be any individual action or sum of actions having any effect on a control or accounting system. Outputs in this context can be the result of any process or action of a control or accounting system. These actions may be transactional in nature, directly entered by a human being as the first electronically recorded action, or may be a result of computations within the system, or may be passed to the system by another system.

DETAILED DESCRIPTION OF THE INVENTION

Figure 1:
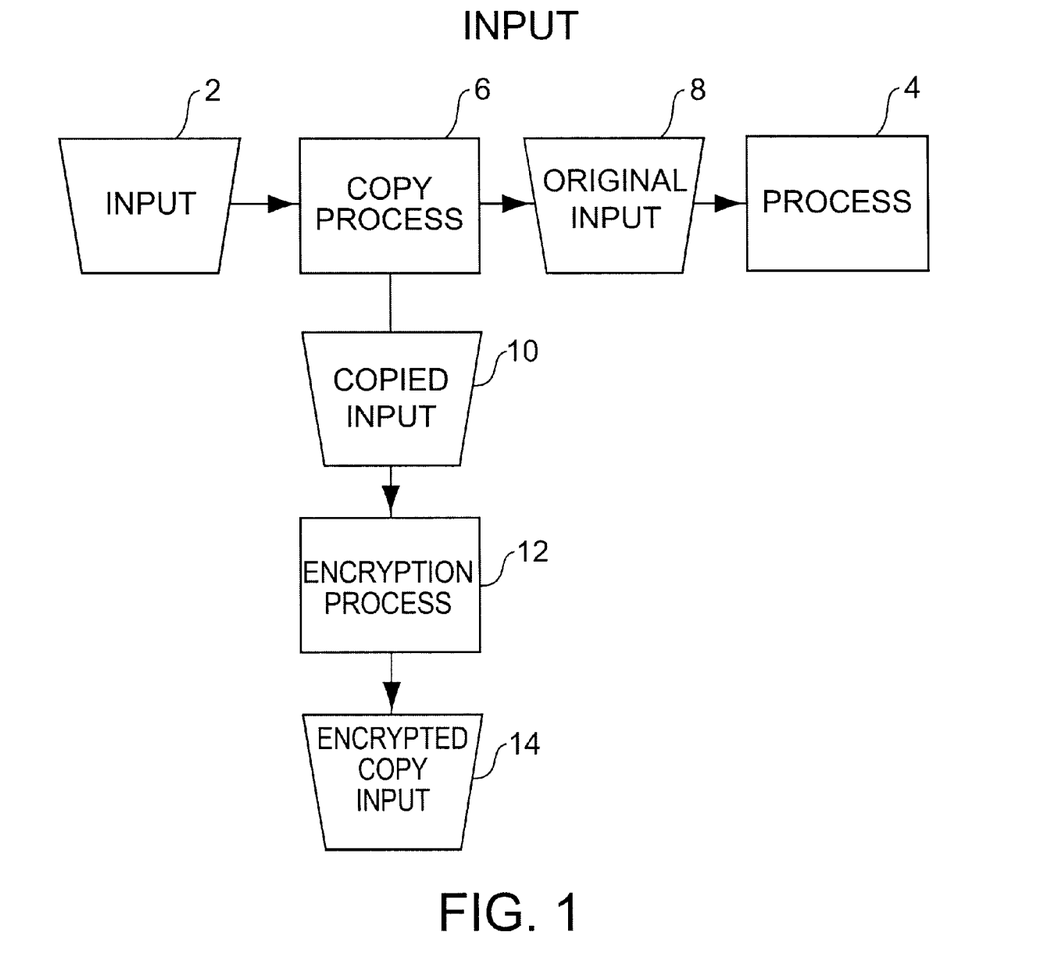
FIG. 1 is a flow diagram of a system using encryption as a tool for checking the integrity of a process.

FIG. 1 is a flow diagram of a system using encryption as a tool for checking the integrity of a process. An input 2 is provided to a system, which is intended to be manipulated by a process 4. However, this input 2 first undergoes a copy process 6 to provide identical inputs 8 and 10. The input 8 is passed on to be processed 4, while the input 10 is encrypted by an encryption process 12. The result of the encryption process 12 is an encrypted copy input 14. An authorized recipient will consider this encrypted copy input 14 to be reliable, due to the integrity provided by the encryption process 12.

Figure 2:
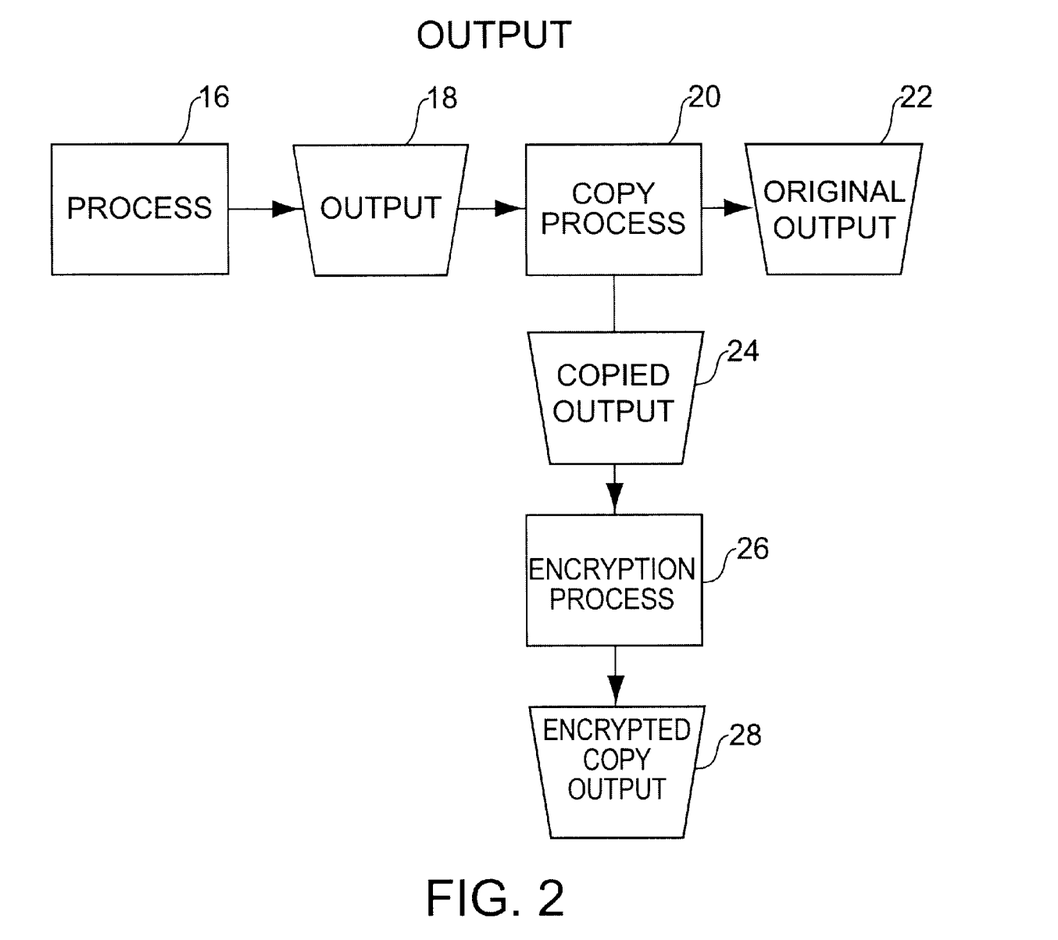
FIG. 2 is a flow diagram showing encryption used in an output context.

Similarly, FIG. 2 shows encryption used in an output context. A process 16 of the system produces an output 18. This output undergoes a copy process 20 to produce two identical outputs 22 and 24. The output 22 continues to its normal destination as determined by the functionality of the system. The output 24 is provided to an encryption process 26, which manipulates the output 24 to generate an encrypted copy output 28. An authorized recipient will consider this encrypted copy output 28 to be reliable, due to the integrity provided by the encryption process 26.

Processes in this context are the manipulation of data according to a set of defined procedures in order to produce a desired result. The result of a process may be used as an input to another process, either within or outside the subsystem, or may be for use outside of the electronic system, such as for display on a screen or other presentation device for direct human use.

Figure 3:
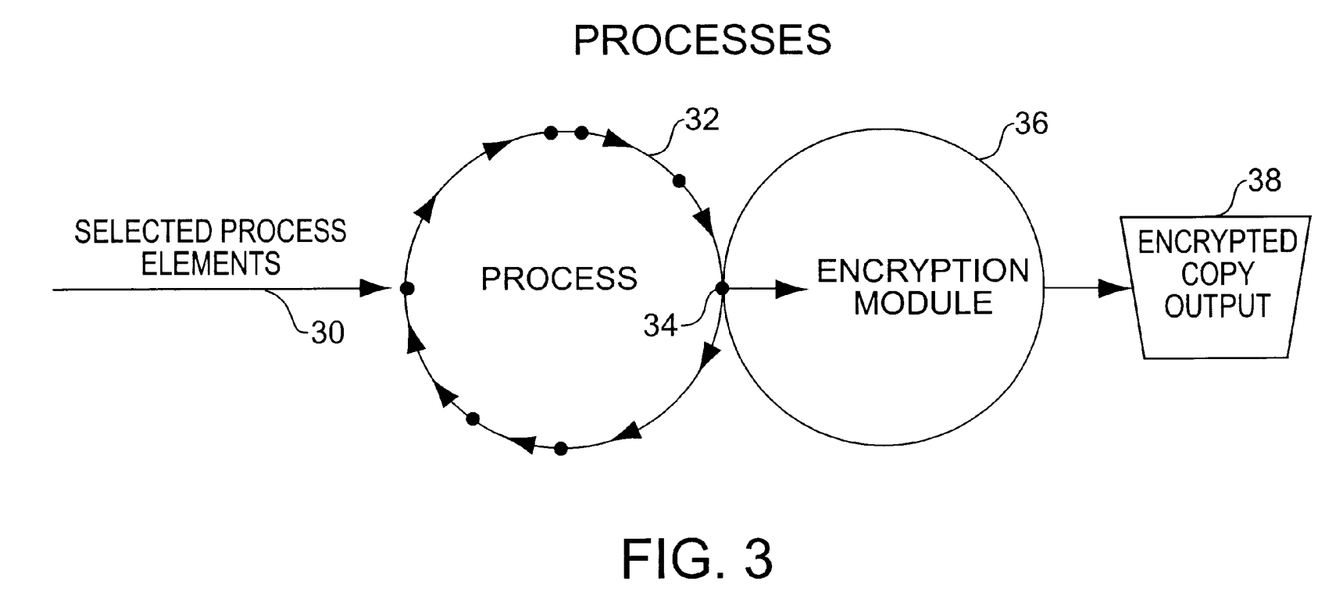
FIG. 3 shows a process by which selected process elements provided as inputs to the process are manipulated.

For example, FIG. 3 shows a process 32 by which selected process elements 30, provided as inputs to the process 32, are manipulated. At a predetermined point 34 in the process 32, the process 32 may be sampled and encrypted by the encryption module 36 to provide an encrypted output 38. Thus, an authorized recipient examining a decrypted version of the encrypted output 38 would have a high level of confidence in the reliability of the process sample due to the integrity provided by the encryption module 36.

Scheduled conditions in this context are the status of all or designated processes, registers, and other conditions within a system at specific times. A review of chronological records of this status information provides evidence of how the system functioned during a specific time period.

Figure 4:
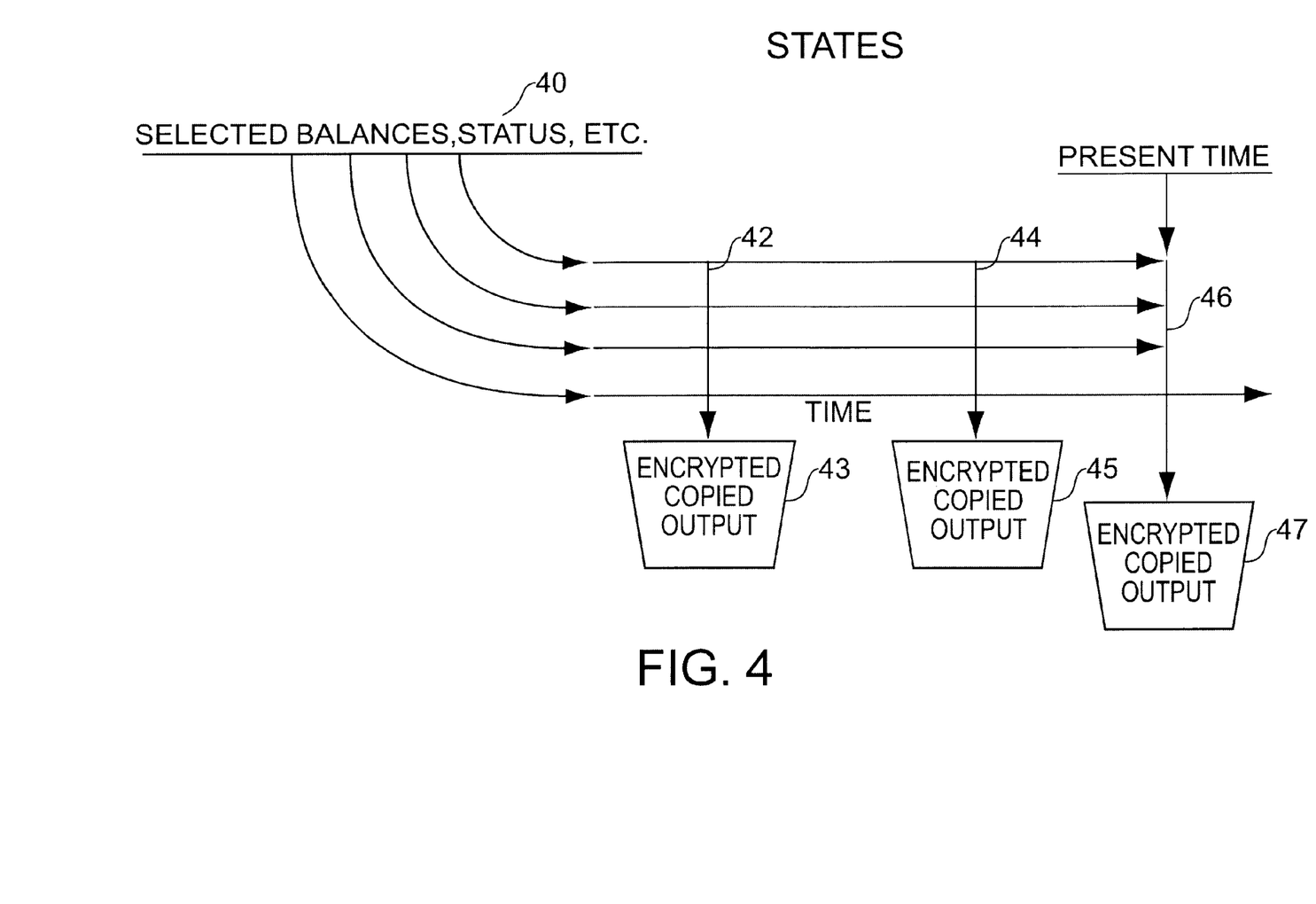
FIG. 4 shows how scheduled conditions may be sampled in a system.

For example, FIG. 4 shows how scheduled conditions may be sampled in a system, so that they may be encrypted to provide a secure, reliable "snapshot" of the system at particular points in time. As the system operates, selected balances, status, and other processes are sampled at different points in time 42, 44, 46. As shown, at a first point in time 42, the processes 40 were sampled to provide a reading of the scheduled condition of the system at that point in time 42. This scheduled condition sample was then encrypted to provide a characteristic encrypted output 43 at the first selected point in time 42. Likewise, at a second point in time 44, the processes 40 were sampled to provide a reading of the scheduled condition of the system at that point in time 44. This scheduled condition sample was then encrypted to provide a second characteristic encrypted output 45 at the second selected point in time 44. Finally, at the present time 46, the processes 40 are sampled to provide a reading of the present scheduled condition of the system. This scheduled condition sample is then encrypted to provide a characteristic encrypted output 47 of the present scheduled condition of the system. Future samples may be taken and encrypted outputs generated. Thus, an authorized recipient examining a decrypted version of the encrypted outputs 43, 45, 47 would have a high level of confidence in the reliability of the scheduled condition samples due to the integrity provided by the encryption process.

Virtual environments in this context are the conditions and influences that were present in the system at the time of encryption. By including virtual environmental information in the scope of encryption, the nature and effect of all influences on encrypted objects can be recorded and analyzed. Virtual environmental information would include, but not be limited to, such things as the order of processing as compared to similar or other items; preprocessing of data, such as data conversion and reformatting; status of other active processes or threads; operating system control information; identity of users logged on; network monitoring information; and other active control processes.

By bonding virtual environmental information to selected data objects with encryption, not only is the integrity of the data object assured, but also the nature and extent of the environment that produced the object can be verified. Further, encrypted objects may be embedded within other objects, encrypted or otherwise, to provide an access hierarchy for users of a system, as described in U.S. Pat. No. 5,369,702 to Shanton. Encrypted objects within the context of the present invention provide verification of the electronic control hierarchy for management and other parties.

Figure 5:
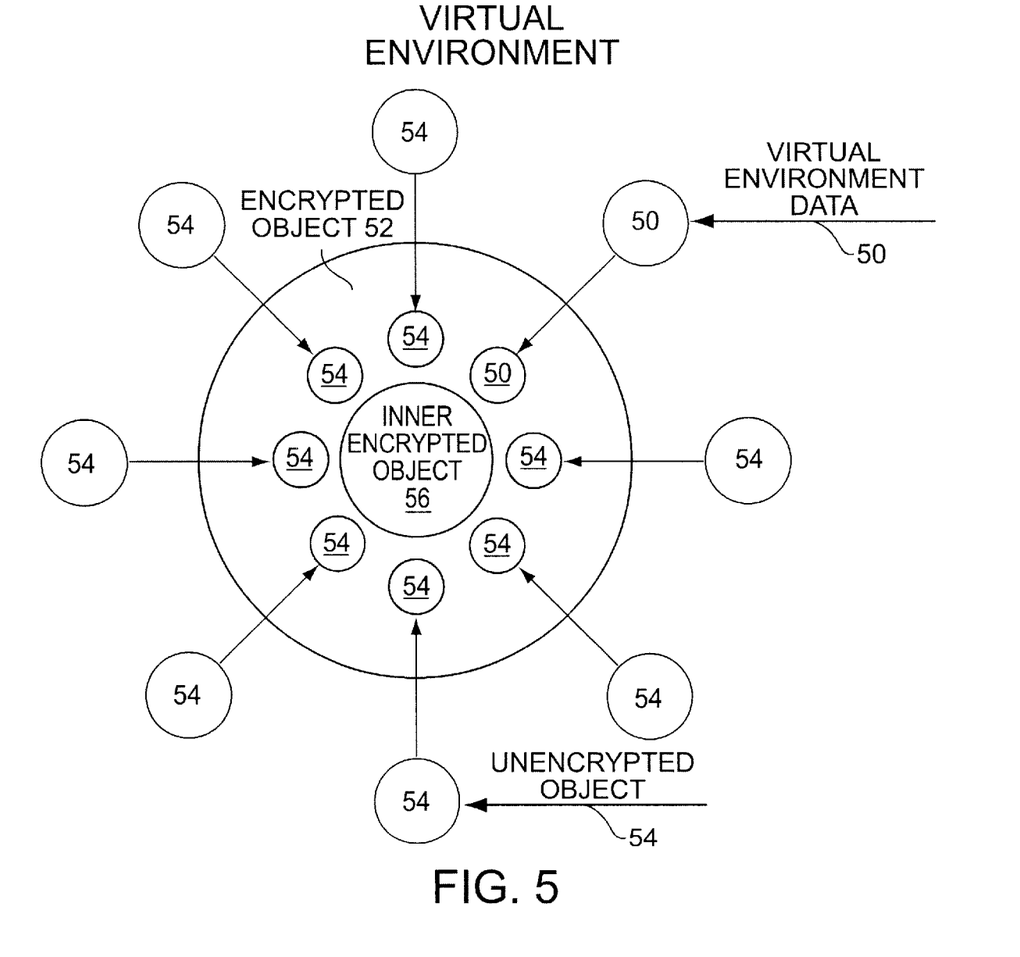
FIG. 5 shows virtual environmental data collected and embedded within an encrypted object.

FIG. 5 shows how virtual environmental data 50 may be collected and embedded within an encrypted object 52. Other related unencrypted objects 54 may also be embedded within the same encrypted object 52, as may be another encrypted object 56. Of course, the collected virtual environment data 50 may be encrypted prior to being embedded within the encrypted object 52, and the inner encrypted object 56 may contain other encrypted and/or unencrypted objects. An authorized recipient examining an extracted virtual environment data object would have a high level of confidence in the reliability of the corresponding data due to the integrity provided by the encryption process used to create the container for the object.

Management, taxing jurisdictions, regulatory authorities, internal authorized recipients, independent accountants, and other parties, can use these features to monitor and audit control systems, as well as the interaction of control systems—a significant benefit as business moves to an electronic world. With this technology, control systems that allow for substantive procedures can provide evidence that other control systems are operating as designed.

Thus, the system can be viewed as an encryption process used to protect and control related objects, or it can be viewed as an audit and control tool to ensure the integrity of the process. A process, such as XML, extends management flow control ability over objects within or retrieved from databases.

The invention will now be described in terms of a particular process, that is, the Extensible Markup Language (XML), for ease of explanation. It is important to note, however, that the invention is not limited to use of this exemplary process, and is intended to be used as broadly as described elsewhere herein. XML is a method that is used to structure and describe data so that it can be understood by different software applications, including database and electronic commerce applications. XML uses tags to label data objects as to meaning, preferably using a specific common industry-wide convention, so that software applications with different purposes and created by different vendors can pass data objects between and among them without the need to restructure the data. XML allows applications to use tagged data objects for input.

XML can be used for information that is transferred from one application to another. Applications include, but are not limited to, business transactions, financial statements, purchase orders, product catalogs, medical histories, database retrieval, etc.

In this example, XML tags are used by application, and perhaps operating a system, software to identify accounting and operational control system objects. Secure accounting and operational control and reporting system (SAOCRS) application software examines selected tagged data objects and, if appropriate, encrypts a copy of the tagged object or groups of objects. Further, encrypted objects may be embedded within other objects, encrypted or otherwise, to provide an access hierarchy for users of a system, as described in U.S. Pat. No. 5,369,702 to Shanton. XML labels may be directly related to or may be grouped or converted in order to relate to referenced process.

The encrypted objects are then either passed directly on a real-time basis to authorized recipients for immediate decryption and further processing, or they are stored and forwarded at a later time.

Figure 6:
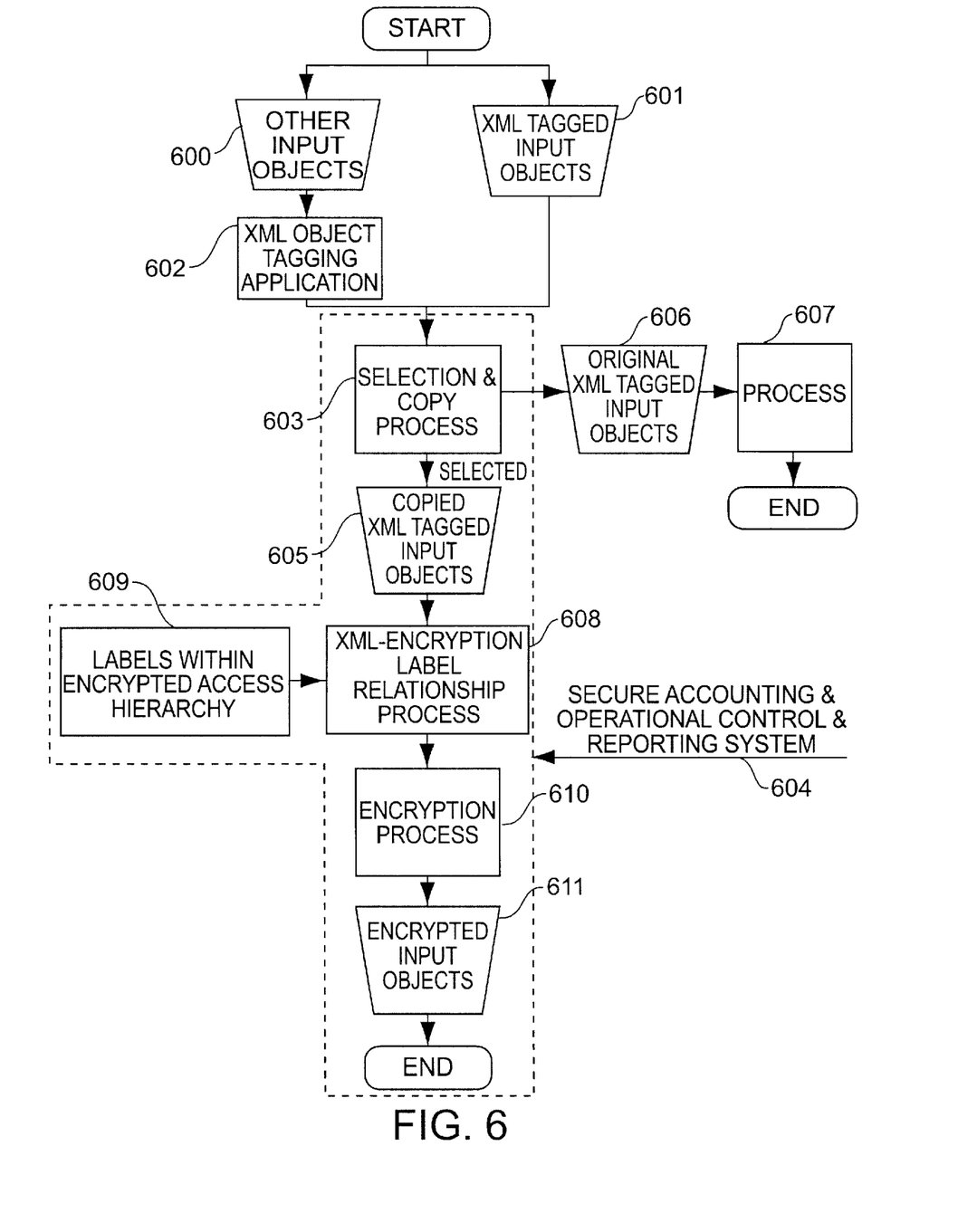
FIG. 6 is a flow diagram showing use of XML to identify, copy, and encrypt input objects in a SAOCRS.

FIG. 6 is a flow diagram showing use of XML to identify, copy, and encrypt input objects in a SAOCRS. Initially, input objects 600 may or may not be related to XML tags; if so, the XML-tagged input objects 601 are provided directly to the selection and copy process 603. If required, an XML object-tagging application 602 applies appropriate XML tags to the input objects 600. The SAOCRS 604, using XML tags to identify object attributes, selects certain objects 605 according to control requirements and causes identical copies to be made. Original tagged input objects 606 are allowed to pass to their intended processes 607.

Within the SAOCRS 604, the XML tags of each copy of selected input objects 605 are related 608 to labels within the encrypted access hierarchy 609 to determine the appropriate role-based access label or labels to be used to encrypt each object. Role-based labels are descriptors of a type or category of access, rather than the identity of a particular person or device allowed access. Each input object copy is encrypted 610 and passed to or stored 611 for appropriate persons, devices, or other systems, including other SAOCRSs.

Figure 7:
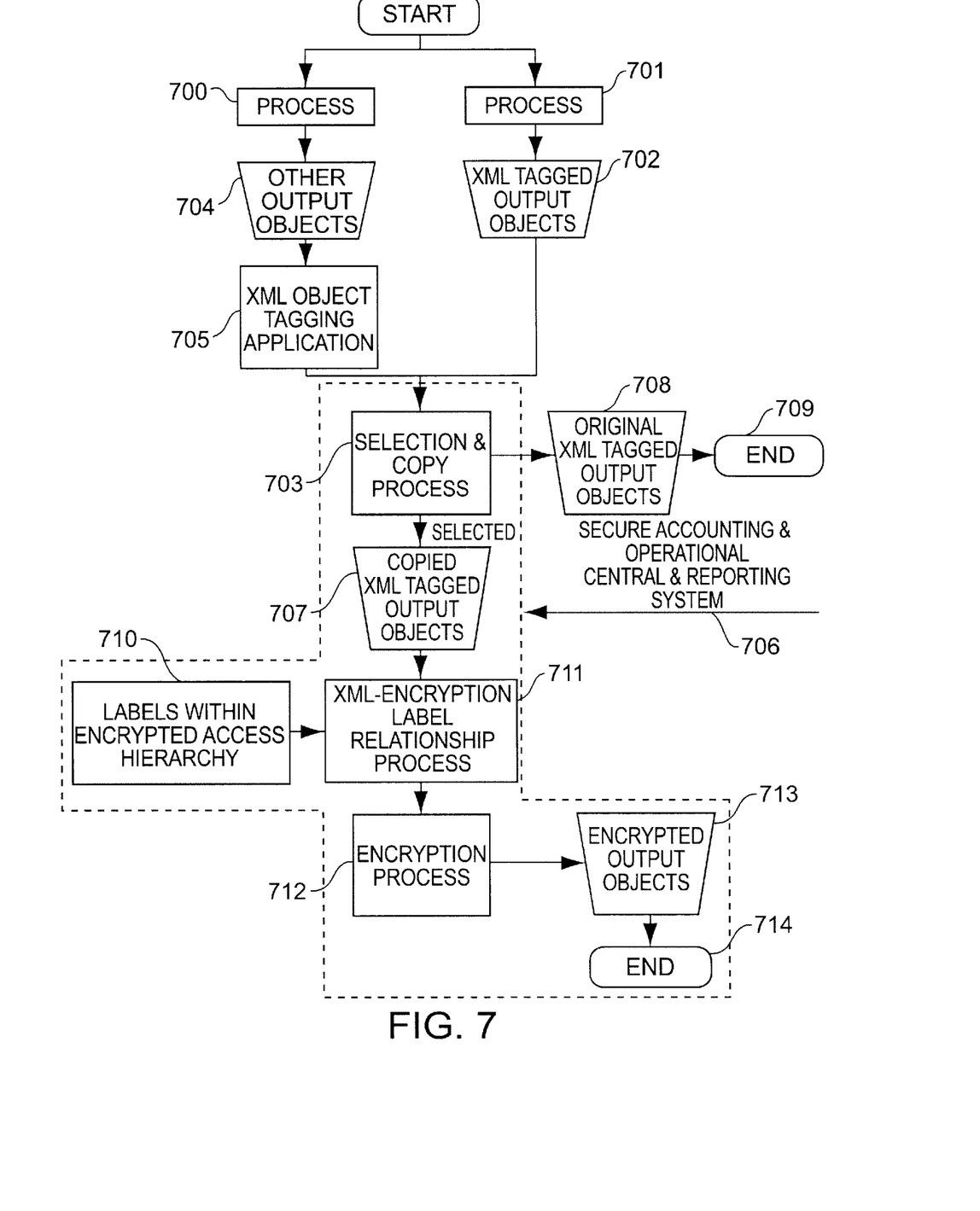
FIG. 7 is a flow diagram showing use of XML to identify, copy, and encrypt copied output objects in a SAOCRS.

FIG. 7 is a flow diagram showing use of XML to identify, copy, and encrypt copied output objects in a SAOCRS. Initially, output objects 702,704 of a process 700, 701 may or may not be related to XML tags; if so, the XML-tagged output objects 702 are provided directly to the selection and copy process 703. If required, an XML object-tagging application 705 applies appropriate XML tags to output objects 704. The SAOCRS 706, using XML tags to identify object attributes, selects certain objects 707 according to control requirements and causes identical copies to be made. Original tagged output objects 708 are allowed to pass to their intended processes 709.

Within the SAOCRS 706, the XML tags of each copy of selected output objects 707 are related, using process 711, to labels within the encrypted access hierarchy 710 to determine the appropriate role-based label or labels to be used to encrypt, via process 712, each object. Each output object copy is encrypted to form encrypted output objects 713 and, at the end 714 of the SAOCRS process, passed to or stored for appropriate persons, devices, or other systems, including other SAOCRSs.

Figure 8:
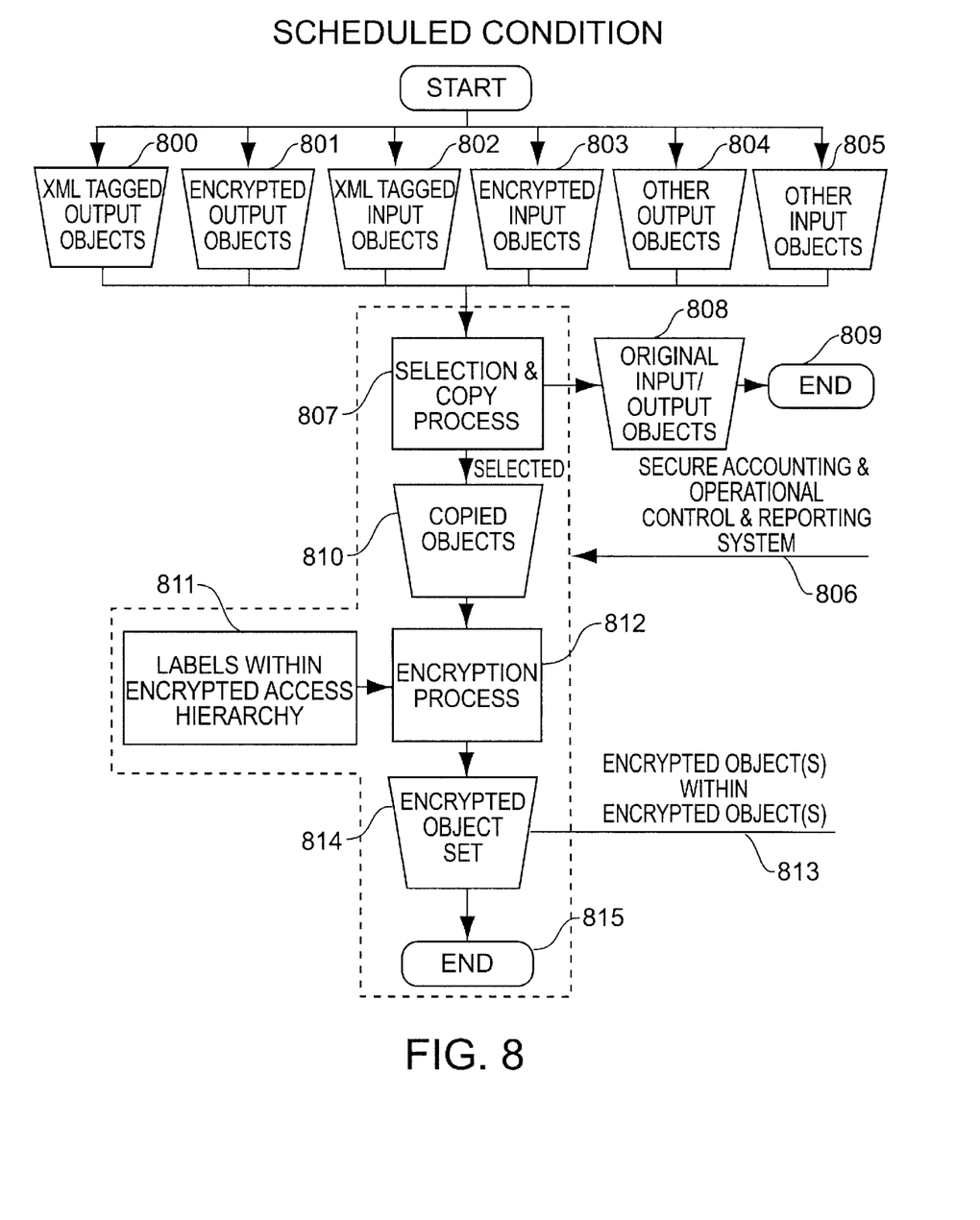
FIG. 8 is a flow diagram showing use of XML to identify, copy and encrypt copied objects in a SAOCRS that in their entirety present a scheduled condition check.

FIG. 8 is a flow diagram showing use of XML to identify, copy, and encrypt copied objects in a SAOCRS that in their entirety present a scheduled condition check. The SAOCRS, from time to time as required, selects input and output objects 800–805 that, when considered in their entirety, fairly represent the condition of a system and in turn assist in affirming the veracity of objects that form the basis for operational or audit activity.

Selected objects 800–805 may or may not have related XML tags that assist in object selection. They each may be either an input or an output of one of multiple separate processes. They may be encrypted input and output objects from other SAOCRSs.

The SAOCRS 806, where possible using XML tags to identify objects attributes, selects certain objects according to control requirements and causes identical copies to be made 807. Original objects 808 are allowed to pass to their intended processes 809.

Within the SAOCRS 806, the XML tags of each copied object 810 of a selected object are related to labels within the encrypted access hierarchy 811 to determine the appropriate role-based label or labels to be used to encrypt, via process 812, each copied object 810. Each selected object 810 without XML tags is related to labels within the encrypted access hierarchy 811 to determine the appropriate role-based label or labels to be used to encrypt, via process 812, each object. Based on the labels within the hierarchy 811 that are used to encrypt, via process 812, each set of objects 810, the SAOCRS 806 determines the appropriate label or labels, within the hierarchy 811, to be used to encrypt, via process 814, all objects within one overall object 813. This inclusive encrypted object 814, containing encrypted objects verifying the system condition, is then, at the end 815 of the SAOCRS process, passed to or stored for appropriated persons, devices, or other systems, including other SAOCRSs.

What is claimed is:

1. A method, comprising:
   providing, consistent with a data format, at least one object relating to a process;
   selecting, from the at least one object, a first object having an object tag associated therewith, wherein the first object is an Extensible Markup Language element;

encrypting at least a portion of the first object according to at least one cryptographic scheme determined at least in part by the object tag; and storing the encrypted at least a portion of the first object for subsequent use by an intended recipient.

2. A method, comprising:

providing, consistent with a data format, at least one object relating to a process, wherein the data format is an Extensible Markup Language format;

selecting, from the at least one object, a first object having an object tag associated therewith;

encrypting at least a portion of the first object according to at least one cryptographic scheme determined at least in part by the object tag; and storing the encrypted at least a portion of the first object for subsequent use by an intended recipient.

3. A method, comprising:

providing, consistent with a data format, at least one object relating to a process;

selecting, from the at least one object, a first object having an object tag associated therewith, wherein the object tag is an Extensible Markup Language tag;

encrypting at least a portion of the first object according to at least one cryptographic scheme determined at least in part by the object tag; and storing the encrypted at least a portion of the first object and the object tag for subsequent use by an intended recipient.

4. An article of manufacture comprising a program storage medium tangibly embodying one or more programs of instructions executable by a computer to perform a method, the method comprising:

providing, consistent with a data format, at least one object relating to a process;

selecting, from the at least one object, a first object having an object tag associated therewith, wherein the first object is an Extensible Markup Language element;

encrypting at least a portion of the first object according to at least one cryptographic scheme determined at least in part by the object tag; and storing the encrypted at least a portion of the first object for subsequent use by an intended recipient.

5. An article of manufacture comprising a program storage medium tangibly embodying one or more programs of instructions executable by a computer to perform a method, the method comprising:

providing, consistent with a data format, at least one object relating to a process, wherein the data format is an Extensible Markup Language format;

selecting, from the at least one object, a first object having an object tag associated therewith;

encrypting at least a portion of the first object according to at least one cryptographic scheme determined at least in part by the object tag; and storing the encrypted at least a portion of the first object for subsequent use by an intended recipient.

6. An article of manufacture comprising a program storage medium tangibly embodying one or more programs of instructions executable by a computer to perform a method, the method comprising:

providing, consistent with a data format, at least one object relating to a process;

selecting, from the at least one object, a first object having an object tag associated therewith, wherein the object tag is an Extensible Markup Language tag;

encrypting at least a portion of the first object according to at least one cryptographic scheme determined at least in part by the object tag; and storing the encrypted at least a portion of the first object for subsequent use by an intended recipient.

7. A method, comprising:

providing a first computer readable medium having stored thereon a first data set comprising a first object and an object tag associated therewith, wherein the first object and the object tag are formatted within the first data set according to a syntax of an Extensible Markup Language;

encrypting at least a portion of the first object according to at least one cryptographic scheme determined at least in part by the object tag;

creating a second data set comprising the encrypted at least a portion of the first object; and storing said second data set on one of the first computer readable medium and a second computer readable medium.

8. The method of claim 7, wherein the encrypted at least a portion of the first object is formatted within the second data set according to one of the syntax and another syntax.

9. The method of claim 8, wherein the other syntax is of another Extensible Markup Language.

10. A method, comprising:

providing a first computer readable medium having stored thereon a first data set comprising a plurality of objects and an object tag for, and associated with, each of the plurality of objects, wherein the plurality of objects and the respective object tags are formatted within the first data set according to a syntax of an Extensible Markup Language; and creating a second data set on one of said first computer readable medium and a second computer readable medium, said creating comprising for at least one of the plurality of objects,
encrypting the respective object according to at least one cryptographic scheme determined at least in part by the respective object tag associated with the respective object, and
storing the encrypted respective object on the one of said first computer readable medium and the second computer readable medium.

11. The method of claim 10, wherein each encrypted object is formatted within the second data set according to one of the syntax and another syntax.

12. The method of claim 11, wherein the other syntax is of another Extensible Markup Language.

* * * * *

(12) EX PARTE REEXAMINATION CERTIFICATE (9453rd)
United States Patent
Kolouch (10) Number: US 6,694,433 C1
(45) Certificate Issued: Dec. 20, 2012

(54) XML ENCRYPTION SCHEME

(75) Inventor: James L. Kolouch, Vienna, VA (US)

(73) Assignee: TecSec Incorporated, Vienna, VA (US)

Reexamination Request:
  No. 90/011,797, Jul. 14, 2011

Reexamination Certificate for:
  Patent No.: 6,694,433
  Issued: Feb. 17, 2004
  Appl. No.: 09/421,293
  Filed: Oct. 20, 1999

Related U.S. Application Data (63) Continuation-in-part of application No. 09/074,649, filed on May 8, 1998, now abandoned.

(60) Provisional application No. 60/045,935, filed on May 8, 1997.

(51) Int. Cl.
  *G06Q 40/00* (2006.01)
  *H04L 9/00* (2006.01)

(52) U.S. Cl. .................. 705/36 R; 707/999.102; 381/55; 705/60; 705/63; 705/75; 705/24; 705/30; 705/401; 705/404; 713/189; 713/193

(58) Field of Classification Search ......................... None
  See application file for complete search history.

(56) References Cited

To view the complete listing of prior art documents cited during the proceeding for Reexamination Control Number 90/011,797, please refer to the USPTO's public Patent Application Information Retrieval (PAIR) system under the Display References tab.

*Primary Examiner* — Jalatee Worjloh (57) ABSTRACT

A secure accounting and operational method, whereby process elements are provided to a process, selected process elements are manipulated, a scheduled condition of the process is sampled at a predetermined point in the process, and the process sample is encrypted to provide an encrypted output. As a result, an authorized recipient has a high level of confidence in the reliability of the scheduled condition samples due to the integrity provided by the encryption process.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12 is confirmed.

New claims 13-32 are added and determined to be patentable.

13. *The method of claim 1, wherein storing the encrypted at least a portion of the first object includes storing the encrypted at least a portion of the first object in persistent memory.*

14. *The method of claim 1, wherein storing the encrypted at least a portion of the first object includes storing the encrypted at least a portion of the first object in transient memory.*

15. *The method of claim 1, wherein the first object is an element and the object tag is an element tag.*

16. *The method of claim 15, further comprising:*
   *relating the element tag to a predetermined role-based access label; and*
   *associating the cryptographic scheme with the role-based access label.*

17. *A method, comprising:*
   *providing, consistent with a data format, an object relating to a process;*
   *selecting, from the object, an element having an element tag associated therewith, wherein the element is an Extensible Markup Language element;*
   *encrypting the selected element according to a cryptographic scheme determined by the element tag; and*
   *storing the object, including the encrypted element.*

18. *The method of claim 17, wherein encrypting the selected element according to the cryptographic scheme determined by the element tag includes identifying the element by the respective element tag, identifying the cryptographic scheme associated with the element tag, and applying the identified cryptographic scheme to the selected element to produce the encrypted element.*

19. *The method of claim 17, wherein the element is a second element in which a first element is embedded, wherein encrypting the selected element includes encrypting the first element as part of the second element.*

20. *A method, comprising:*
   *providing, consistent with a data format, an object relating to a process;*
   *selecting, from the object, a plurality of elements having respective element tags associated therewith, wherein the elements are Extensible Markup Language elements;*
   *encrypting each said element according to a respective cryptographic scheme determined by the respective element tag; and*
   *storing the object, including the encrypted elements.*

21. *The method of claim 20, further comprising:*
   *relating each said element tag to a predetermined role-based access label; and*
   *associating the cryptographic scheme with each said role-based access label, to create an access hierarchy.*

22. *The method of claim 20, wherein encrypting each said element according to the cryptographic scheme determined by the respective element tag includes identifying each said element by the respective element tag, identifying the cryptographic scheme associated with each said respective element tag, and applying the respective identified cryptographic scheme to each said selected element to produce each said encrypted element.*

23. *The method of claim 20, wherein at least one said element tag includes identification information unrelated to access authorization.*

24. *The method of claim 20, wherein at least one said element tag includes identification information unrelated to authentication.*

25. *The method of claim 20, wherein the plurality of elements is a first plurality of elements and the element tags are first element tags, further comprising:*
   *selecting a second plurality of elements having second respective element tags associated therewith, wherein the second plurality of elements are Extensible Markup Language elements; and*
   *without encrypting the selected second plurality of elements, storing the object, including the encrypted elements and the second elements.*

26. *A method, comprising:*
   *providing, consistent with a data format, an object relating to a process;*
   *copying the object, to produce a copied object;*
   *carrying on the process according to the object;*
   *selecting, from the copied object, a plurality of elements having respective element tags associated therewith, wherein the elements are Extensible Markup Language elements;*
   *encrypting each said element according to a cryptographic scheme determined by the respective element tag; and*
   *storing the copied object, including the encrypted elements.*

27. *The method of claim 26, further comprising:*
   *relating each said element tag to a predetermined role-based access label; and*
   *associating the cryptographic scheme with each said role-based access label.*

28. *The method of claim 26, wherein the cryptographic scheme includes virtual environmental information.*

29. *A non-transitory storage medium, on which is stored instructions that, when executed by a processing device, cause the processing device to perform a method that includes:*
   *providing, consistent with a data format, an object relating to a process;*
   *selecting, from the object, an element having an element tag associated therewith, wherein the element is an Extensible Markup Language element;*
   *encrypting the selected element according to a cryptographic scheme determined by the respective element tag; and*
   *storing the object, including the encrypted element.*

30. *The storage medium of claim 29, wherein the method includes:*
   *relating the element tag to a predetermined role-based access label; and* associating the cryptographic scheme with the role-based access label.

31. A non-transitory storage medium, on which is stored instructions that, when executed by a processing device, cause the processing device to perform a method that includes;
    providing, consistent with a data format, object relating to a process;
    selecting, from the object, a plurality of elements having respective element tags associated therewith, wherein the elements are Extensible Markup Language elements;
    encrypting each said element according to a cryptographic scheme determined by the respective element tag; and
    storing the object, including the encrypted elements.

32. The storage medium of claim 31, wherein the method further comprises:
    relating each said element tag to a predetermined role-based access label; and
    associating the cryptographic scheme with each said role-based access label.

* * * * *